(12) United States Patent
Chandra et al.

(10) Patent No.: US 7,509,298 B2
(45) Date of Patent: Mar. 24, 2009

(54) SYSTEM AND METHOD FOR A LOGICAL-MODEL BASED APPLICATION UNDERSTANDING AND TRANSFORMATION

(75) Inventors: Satish Chandra, White Plains, NY (US); John H. Field, Newtown, CT (US); Raghavan Komondoor, New Delhi (IN); Ganesan Ramalingam, Bangalore (IN); Saurabh Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/394,522

(22) Filed: Mar. 31, 2006

(65) Prior Publication Data

US 2007/0240109 A1    Oct. 11, 2007

(51) Int. Cl.
*G06F 9/22* (2006.01)
*G06N 7/02* (2006.01)
*G06N 7/06* (2006.01)

(52) U.S. Cl. .............................................. 706/52
(58) Field of Classification Search .................. None
See application file for complete search history.

(56) References Cited

U.S. PATENT DOCUMENTS

| | | | | |
|---|---|---|---|---|
| 4,025,810 A | * | 5/1977 | Field | 310/162 |
| 4,112,319 A | * | 9/1978 | Field | 310/49 R |
| 4,567,482 A | * | 1/1986 | Dolsen et al. | 370/222 |
| 4,762,867 A | * | 8/1988 | Flodin et al. | 524/5 |
| 4,989,162 A | * | 1/1991 | Tanaka et al. | 706/48 |
| 5,027,305 A | * | 6/1991 | Tanaka et al. | 706/48 |
| 5,347,614 A | * | 9/1994 | Yamada et al. | 706/59 |
| 5,907,707 A | * | 5/1999 | Ramalingam et al. | 717/104 |

(Continued)

OTHER PUBLICATIONS

An Empirical Comparison of Automated Generation and Classification Techniques for Object-Oriented Unit Testing d'Amorim, M.; Pacheco, C.; Tao Xie; Marinov, D.; Ernst, M.D.; Automated Software Engineering, 2006. ASE '06. 21st IEEE/ACM International Conference on Sep. 2006 pp. 59-68 Digital Object Identifier 10.1109/ASE.2006.13.*

(Continued)

*Primary Examiner*—Michael B Holmes
(74) *Attorney, Agent, or Firm*—Scully, Scott, Murphy & Presser, P.C.; Gail Zarick, Esq.

(57) ABSTRACT

Disclosed is a method of and a system for establishing a logical-model based understanding of a legacy application. The method comprises the steps of providing a physical data model of the legacy application, said physical data model having a plurality of physical elements; establishing a logical data model for the legacy application, said logical data model having a plurality of logical model elements; and establishing links between said logical model elements and said physical elements. One of said physical or logical elements is selected, and said links are used to identify all of the physical or logical elements that are linked to said selected one of said elements. The preferred system may include a component for browsing and navigating the physical data model, logical data model, or the links between them, a component to answer queries about the application expressed using the logical data model, and a component to create a relational data model to support the migration of data stored in legacy databases (including flat files) to relational databases.

1 Claim, 6 Drawing Sheets

U.S. PATENT DOCUMENTS

| | | | | |
|---|---|---|---|---|
| 5,932,000 | A * | 8/1999 | Bergqvist et al. | 106/737 |
| 6,163,880 | A * | 12/2000 | Ramalingam et al. | 717/104 |
| 6,179,491 | B1 * | 1/2001 | Choi et al. | 717/116 |
| 6,279,149 | B1 * | 8/2001 | Field et al. | 717/129 |
| 6,301,700 | B1 * | 10/2001 | Choi et al. | 717/116 |
| 6,395,402 | B1 * | 5/2002 | Lambert et al. | 428/550 |
| 6,636,866 | B1 * | 10/2003 | Ramalingam | 707/103 R |
| 6,789,127 | B1 * | 9/2004 | Chandra et al. | 709/246 |
| 7,002,903 | B2 * | 2/2006 | Chandra et al. | 370/209 |
| 7,054,443 | B1 * | 5/2006 | Jakubowski et al. | 380/28 |
| 7,058,941 | B1 * | 6/2006 | Venkatesan et al. | 717/168 |
| 7,219,279 | B2 * | 5/2007 | Chandra et al. | 714/724 |
| 7,228,426 | B2 * | 6/2007 | Sinha et al. | 713/176 |
| 7,263,531 | B2 * | 8/2007 | Venkatesan et al. | 707/102 |
| 7,308,130 | B2 * | 12/2007 | Pahk et al. | 382/152 |
| 7,346,780 | B2 * | 3/2008 | Sinha et al. | 713/187 |

OTHER PUBLICATIONS

A fuzzy knowledge-based approach to the alternative classification problems Kuo-Sui Lin; McEwan, W.; Farn, K.-J.; Fuzzy Information Processing Society, 1996. NAFIPS. 1996 Biennial Conference of the North American Jun. 19-22, 1996 pp. 307-311 Digital Object Identifier 10.1109/NAFIPS.1996.534750.*

Inferring privacy information via social relations Wanhong Xu; Xi Zhou; Lei Li; Data Engineering Workshop, 2008. ICDEW 2008. IEEE 24th International Conference on Apr. 7-12, 2008 pp. 525-530 Digital Object Identifier 10.1109/ICDEW.2008.4498373.*

Classification methods, reduced datasets and quality analysis applications Alippi, C.; Braione, P.; Computational Intelligence for Measurement Systems and Applications, 2004. CIMSA. 2004 IEEE International Conference on Jul. 14-16, 2004 pp. 121-126 Digital Object Identifier 10.1109/CIMSA.2004.1397246.*

Classification methods and inductive learning rules: what we may learn from theory C. Alippi; P. Braione; Systems, Man, and Cybernetics, Part C: Applications and Reviews, IEEE Transactions on vol. 36, Issue 5, Sep. 2006 pp. 649-655 Digital Object Identifier 10.1109/TSMCC.2005.855508.*

The trade-offs between manual and computer-based stereology/classification: application to estimates of volume fraction Markowitz, Z.; Loew, M.H.; Engineering in Medicine and Biology Society, 2003. Proceedings of the 25th Annual International Conference of the IEEE vol. 1, Sep. 17-21, 2003 pp. 770-773 vol. 1.*

Multiclass Support Vector Machines for EEG-Signals Classification Guler, I.; Ubeyli, E.D.; Information Technology in Biomedicine, IEEE Transactions on vol. 11, Issue 2, Mar. 2007 pp. 117-126 Digital Object Identifier 10.1109/TITB.2006.879600.*

Inferring urban land use from IKONOS image Xiuying Zhang; Xuezhi Feng; Satyanarayana, B.; Youshui Zhang; Geoscience and Remote Sensing Symposium, 2004. IGARSS '04. Proceedings. 2004 IEEE International vol. 4, Sep. 20-24, 2004 pp. 2695-2698 vol. 4 Digital Object Identifier 10.1109/IGARSS.2004.1369856.*

Bayesian network structure learning and inference in indoor vs. outdoor image classification Kane, M.J.; Savakis, A.; Pattern Recognition, 2004. ICPR 2004. Proceedings of the 17th International Conference on vol. 2, Aug. 23-26, 2004 pp. 479-482 vol. 2 Digital Object Identifier 10.1109/ICPR.2004.1334268.*

Inference of gene regulatory network based on module network model with gene functional classifications Taki, K.; Teramoto, R.; Takenaka, Y.; Matsuda, H.; Computational Systems Bioinformatics Conference, 2004. CBS 2004. Proceedings. 2004 IEEE Aug. 16-19, 2004 pp. 632-633 Digital Object Identifier 10.1109/CSB.2004.1332524.*

R. Komondoor, et al., "Guarded Types for Program Understanding", In Proc. Intl. Conf. On Tools and Algorithms for the Construction and Analysis of Systems, pp. 157-173—(2005).

* cited by examiner

```
01 input-record.
    05 ir-trans-code pic x(1).
    05 ir-user-name pic x(8).
    05 ir-acc-num redifines ir-user-name.
    05 ir-data pic x(12).
01 account-rec.
    05 ar-acc-num pic x(8).
    05 ar-user-name pic x(8).
    05 ar-data pic x(5).
01 withdrawal-info.
    05 wi-amount pic x(6).
    05 wi-date pic x(6).
01 date-range.
    05 dr-from pic x(6).
    05 dr-to pic x(6).
01 log-record.
    05 ir-header pic x(9).
    05 lr-filler pic x(12).
```

FIG. 1

```
/1/ READ input record FROM tansact-file.
/2/ READ account-rec FROM account-file.
       WHERE ar-user-name = ir-user-name.
/3/ MOVE ar-acc-num TO ir-acc-num.
/4/ IF ir-trans-code = 'w' THEN
/5/   MOVE ir-data TO withdrawal-info
/6/   WRITE ir-acc-num, wi-amount, wi-date TO withdr-file
    ELSE
/7/   MOVE ir-data TO date-range
/8/   WRITE ir-acc-num, dr-from, dr-to TO inquiry-file
    END IF
/9/ MOVE input-record TO log-record.
/10/ WRITE lr-header TO log-file.
```

| VARIABLE REFERENCE $v$ (VAR. NAME:LINE #) | ACCESS PATH $L(v)$ | TYPE OF $v$ |
|---|---|---|
| input-record:1 | Root.inpRec | InputRecord |
| account-rec:2 | Root.accRec | AccountRec |
| ir-user-name:2 | Root.inpRec → InputRecord.Reader → InputHeader.accId | UserName |
| ar-acc-num:3 | Root.accRec → AccountRec.aNum | AccountNum |
| ir-acc-num:3 | Root.inpRec → InputRecord.header → InputHeader.accId | AccountNum |
| ir-trans-code:4 | Root.inpRec → InputRecord.header → InputHeader.code | TransactCode |
| ir-data:5 | Root.inpRec → IRWithdraw.info | WithdrawalInfo |
| wi-amount:6 | WithdrawRoot.info → WithdrawInfo.amount | Amount |
| ir-data:7 | Root.inpRec → IRInquiry.dtRange | DateRange |
| log-record:9 | Root.logRec | InputRecord |
| lr-header:10 | Root.logRec → InputRecord.header | InputHeader |

FIG. 2B

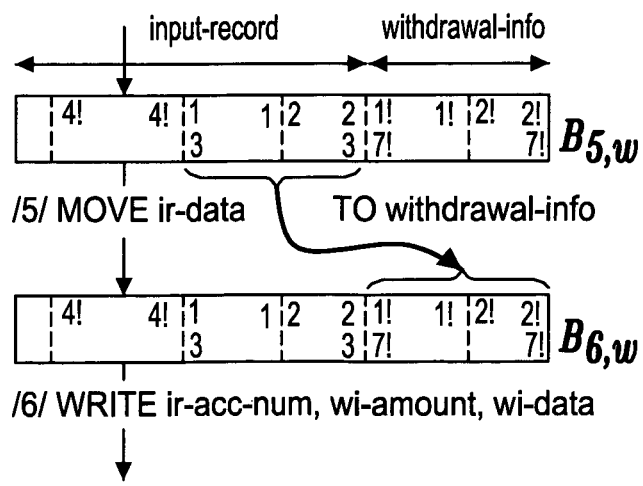

FIG. 3

$$\frac{B_1 \xrightarrow{S} B_2, r \in \mathit{refs}(S)}{r \in \mathit{cuts}(B_1)} \qquad \text{[REF]}$$

$$\frac{B_1 \xrightarrow{S} B_2, r \in \mathit{defs}(S)}{r \in \mathit{cuts}(B_1),\ r \in \mathit{cuts}(B_2), (B_1,r) \sim_f (B_2,r)} \qquad \text{[DEF]}$$

$$\frac{B_1 \xrightarrow{S} B_2, r \in \mathit{cuts}(B_1), r \cap \mathit{lval}(S) = \phi}{r \in \mathit{cuts}(B_2), (B_1,r) \approx (B_2,r)} \qquad \text{[VALUE-FLOW-1]}$$

$$\frac{B_1 \xrightarrow{S} B_2, r \in \mathit{cuts}(B_2), r \cap \mathit{lval}(S) = \phi}{r \in \mathit{cuts}(B_1), (B_1,r) \approx (B_2,r)} \qquad \text{[VALUE-FLOW-2]}$$

$$\frac{(B_1,r_1) \Rightarrow (B_2,r_2), r_3 \in \mathit{cuts}(B_1),\ r_3 \subset r_1, r_4 = r_3 + (r_2.\mathit{left} - r_1.\mathit{left})}{r_4 \in \mathit{cuts}(B_2), (B_1,r_3) \approx (B_2,r_4)} \qquad \text{[VALUE-FLOW-3]}$$

$$\frac{(B_1,r_1) \Rightarrow (B_2,r_2), r_4 \in \mathit{cuts}(B_2),\ r_4 \subset r_1, r_3 = r_4 + (r_1.\mathit{left} - r_2.\mathit{left})}{r_3 \in \mathit{cuts}(B_1), (B_1,r_3) \approx (B_2,r_4)} \qquad \text{[VALUE-FLOW-4]}$$

$$\frac{(B_1,r_1) \Rightarrow (B_2,r_2),}{(B_1,r_1) \sim_i (B_2,r_2)} \qquad \text{[VALUE-FLOW-5]}$$

$$\frac{B_1 \xrightarrow{S} B_2, r \in \mathit{cuts}(B_1), r \supset \mathit{lval}(S)}{r \in \mathit{cuts}(B_2), (B_1,r) \approx (B_2,r),} \qquad \text{[SUPERCUT-FLOW-1]}$$

$$\frac{B_1 \xrightarrow{S} B_2, r \in \mathit{cuts}(B_2), r \supset \mathit{lval}(S)}{r \in \mathit{cuts}(B_1), (B_1,r) \approx (B_2,r),} \qquad \text{[SUPERCUT-FLOW-2]}$$

$$\frac{B_1 \xrightarrow{S} B_2,\ [1,M] \supset \mathit{lval}(S)}{(B_1,[1,M]) \sim_i (B_2,[1,M])} \qquad \text{[SUPERCUT-FLOW-3]}$$

$$\frac{\begin{array}{c} B_1 \xrightarrow{S} B_2, B_3 \xrightarrow{S} B_4, r_2 \supseteq r_1, \\ r_1 \in \mathit{refs}(S) \cup \mathit{defs}(S), r_2 \in \mathit{cuts}(B_1) \\ B_1 = (u,P_1), B_2 = (u,P_2) \end{array}}{r_2 \in \mathit{cuts}(B_3), (B_1,r_2) \sim_f (B_3,r_2)} \qquad \text{[ACCESS-PATH]}$$

FIG. 5

```
    01 PAY-REC.
        05 PAYEE-TYPE PIC X.
        05 DATA PIC K(13)
    01 PAY PIC I(4).
/1/ READ PAY-REC FROM IN-F.

/2/ MOVE 'N' TO IS-VISITOR.
/3/ IF PAYEE-TYPE - 'E'
/4/     MOVE DATA [8:11] TO PAY.
    ELSE
/5/     MOVE 'Y' TO IS-VISITOR.
/6/     MOVE DATA [10:13] TO PAY.
    END IF
/7/ WRITE PAY TO PAY-F.
/8/ IF IS-VISITOR - 'Y'
/9/     WRITE DATA [6:9] TO VIS-F.
```

['E':Emp ⊗ Eld ⊗ Salary ⊗ Unused |
!{'E'}:Vis ⊗ SSN5 ⊗ SSN4 ⊗ Stipend]
[N':VisNo]
['E':Emp | !{'E'}:Vis]
[Salary]

['Y':VisYes]
[Stipend]

[Salary | Stipend]
['N':VisNo | 'Y':VisYes]
[SSN4]

FIG. 6A

```
    01 ID.
        05 ID-TYPE PIC X (3).
        05 ID-DATA PIC X (9).
        05 SSN PIC X (9) REDIFINES ID-DATA.
        05 EMP-ID PIC X(7) REDIFINES ID-DATA.
/1/ 01 READ ID.

/2/ IF ID-TYPE = 'SSN'
/3/    WRITE SSN TO SSN-F
    ELSE
/4/    WRITE EMP-ID TO EID-F.
    ENDIF
```

[ 'SSN':SSNTyp ⊗ SSN |
!{'SSN'}:EldTyp ⊗ Eld ⊗ Unused]
["SSN":SSNTyp | !{'SSN'}:EldTyp]
[SSN]

[Eld]

FIG. 6B

```
    01 SSN.
    01 SSN-EXPANDED REDEFINES SSN.
        05 FIRST-5-DIGITS X(5).
        05 LAST-4-DIGITS X(4).
/1/ READ SSN FROM IDS-F.
/2/ WRITE LAST-4-DIGITS
```

[SSN5 ⊗ SSN4]
[SSN4]

FIG. 6C

SYSTEM AND METHOD FOR A LOGICAL-MODEL BASED APPLICATION UNDERSTANDING AND TRANSFORMATION

BACKGROUND OF THE INVENTION

1. Field of the Invention

The present invention relates to tools for maintenance of computer applications.

2. Description of the Related Art

Maintenance of computer applications (or software maintenance) is expensive and time-consuming. One of the reasons for this is that over time, applications are continuously modified and tend to lose any logical structure they had and become harder to understand and maintain. For instance, persistent data is the foundation on which all large legacy business applications are built. Over time, however, the physical representation of legacy data can become so fragmented and convoluted that it becomes the principal impediment to adding new business functionality, to integrating new systems, and to retiring old ones.

What is desirable in maintaining and modifying such systems is a model of the logical structure of legacy data, which we refer to as a logical data model, (as opposed to its physical realization (which we refer to as a physical data model), as well as information describing how this logical structure is actually realized in the applications (which we refer to as a linkage between the logical and physical data models).

For example, a particular application may make use of a logical concept "customer number". It is often hard to identify all variables that store a "customer number" through a manual inspection. Legacy languages like Cobol do not have the concept of a "type" for variables. Variable names can often be misleading. The same variable can be used to store different information at different times. A "customer number" may even be stored in various different formats in different parts of an application.

The logical concept "customer number" is part of the logical data model. The set of variables used in an application are part of the physical data model. Links between the logical and physical data model can indicate which variables in an application are used as customer numbers.

A software maintenance tool that maintains such a logical data model, along with links to the physical data model, can make changes to the application easier. As an example, a user can ask the system to show all the lines of code in a program where a "customer number" is used. The system can use the links to identify all variables in the program that represent a "customer number" and then identify and report all lines of code where any of these variables are used. This allows users who may not be familiar with the implementation to ask questions using the business or domain vocabulary.

The logical data model and the links serve as a formal documentation of the system that is machine-readable and, hence, usable by various programming tools.

No such maintenance tool is available for legacy programming languages (such as Cobol) today.

Existing modeling tools, such as Rational Rose, allow developers to create logical data models and then generate physical models and code from these logical models. However, they do not help with the problem faced in the maintenance of legacy applications, applications that already exist but have no logical models.

Existing reverse engineering tools (such as those available with Rational Rose) tend to create a data model that is isomorphic to the physical realization in the application. Hence, these are more physical data models rather than logical data models.

Existing program-understanding tools for legacy languages (such as RescurWare from Relativity) help with various program understanding tasks, but do not create a logical data model that is linked to the physical data model (or application).

SUMMARY OF THE INVENTION

It is, therefore, an object of the present invention to provide a method and system for understanding and transforming legacy applications that makes use of a logical data model and links between the logical data model and a physical data model.

The preferred system may include several optional components.

1. A component for creating a physical data model of an application.

2. A component for creating a logical data model for an existing application.

3. A component for creating links between the existing application or a physical data model and the logical data model.

4. A component for browsing and navigating the physical data model, the logical data model, or the links between them.

5. A component to answer queries about the application expressed using the logical data model.

6. A component to create a relational data model to support the migration of data stored in legacy databases (including flat files) to relational databases.

7. A component for creating service interface declarations and service implementations from a program using a logical data model linked to the program.

The physical data model is a direct representation of the data structures or program variables used by an application and can be created using a parser that parses the application.

We describe several ways of creating a logical data model for an existing application as well as the links between the logical and physical data models. The first is a manual approach where a user uses an editor to create the logical data model and the links.

The second approach is a semi-automated approach where, when the user adds a link between the logical data model and the physical data model, the tool identifies through an analysis of the application, other candidate links and adds them, subject to user approval. As an example, assume that the user creates a link between a program variable named "CUST" (which is an element of the physical data model) and a logical model element "Customer Number" (which is an element of the logical data model). Assume further that the program has a statement "MOVE CUST TO CUST-NUM". The tool can analyze the program, identify this statement and propose to create a link between "CUST-NUM" (which is an element of the physical data model) and "Customer Number".

The third approach is to automatically create a candidate logical data model, along with links to the physical data model by analyzing the statements in the program. The user can then manually refine this candidate model by making any necessary changes. The system creates the candidate logical data model by applying a type inference algorithm to the statements of the program, which identifies groups of variables that appear to have the same type. For every such group, the system automatically creates a logical model element and links this element to the group of variables.

The navigation (or browsing) component allows the user to select an element of the physical or logical data model and to ask the system to show all elements that are linked to the selected element.

The next component allows users to ask queries using the logical data model. We use the term "physical model query" to denote any question that the user can ask of the system with respect to some set of physical model elements. An example is the "physical model query" which asks the system to show all lines of code in the program that refer to one of a given set of program variables.

Another example is the query which asks the system to show all statements that assign a value to one of a given set of program variables. Another query is to ask the system to show all "branching conditions" in a program that refer to one of a given set of program variables.

The system allows the user to ask these queries in terms of the logical data model as well. When the user asks a query in terms of a logical data model element (a "logical model query"), the system transforms the query into a "physical model query". over the set of all physical model elements that are linked to the selected logical model element, and then executes this "physical model query".

The final component is intended to address a common problem, namely migrating data stored in legacy databases (such as flat files, hierarchical databases and network databases) to relational databases. Such a migration first requires the creation of a relational database schema for the data to be stored in the database. The method described above for automatically identifying a candidate logical data model through analysis of the applications can be used to create the relational schema. Specifically, the component identifies the physical model elements corresponding to the persistent data (files) that need to be migrated, identifies the logical model elements linked to these physical model elements, and generates the relational schema from the definition of these logical model elements.

The following example illustrates how the analysis helps create the relational database schema. Consider a file F containing data that needs to be migrated. The file F may be associated with a record R in a program. However, the record R may simply be declared to be of some specific length, say 80 bytes, without any declaration of the logical structure of the data in record R. However, assume the program contains a statement that moves the data in record R to another program variable V with a well-defined record structure. The method described earlier will create a logical model element L that captures the record-structure of variable V, and will link record R (as well as variable V) to this logical model element L. In general, the logical structure of L may be obtained from more than one physical model element (or program variable). This logical structure of L is used to generate a corresponding relational database schema, using standard techniques.

In accordance with one aspect of the invention, a method is provided for establishing a logical-model based understanding of a legacy application. This method comprises the steps of: providing a physical data model of the legacy application, said physical data model having a plurality of physical elements; establishing a logical data model for the legacy application, said logical data model having a plurality of logical model elements; establishing links between said logical model elements and said physical elements; and selecting one of said physical or logical elements, and using said links to identify all of the physical or logical elements that are linked to said selected one of said elements. In this method, for example, the step of establishing the logical data model includes the steps of: searching through the legacy application; and identifying selected ones of the physical elements of the legacy application as logical elements for the logical data model. Also, the step of establishing links includes the steps of: a user adding one of the links between the physical elements and the logical elements; and when said user adds said one of the links, using a software tool to identify additional candidate links between the physical elements and the logical elements.

In accordance with another aspect of the invention, a system is provided for establishing a logical-model based understanding of a legacy application. This system comprises: means for providing a physical data model of the legacy application, said physical data model having a plurality of physical elements; means for establishing a logical data model for the legacy application, said logical data model having a plurality of logical model elements; means for establishing a plurality of links between said logical model elements and said physical elements; and means for selecting one of said physical or logical elements, and using said links to identify all of the physical or logical elements that are linked to said selected one of said elements. In a preferred system, for example, the means for establishing the logical data model includes: means for searching through the legacy application; and means for identifying selected ones of the physical elements of the legacy application as logical elements for the logical data model. Also, in this preferred system, the means for establishing links includes: means for adding one of the links between the physical elements and the logical elements; and a software tool operable, after said adding one of the links, to identify additional candidate links between the physical elements and the logical elements.

In accordance with another aspect, the invention provides a program storage device readable by machine, tangibly embodying a program of instructions executable by the machine to perform method steps for establishing a logical-model based understanding of a legacy application. Said method steps comprise: providing a physical data model of the legacy application, said physical data model having a plurality of physical elements; establishing a logical data model for the legacy application, said logical data model having a plurality of logical model elements; establishing links between said logical model elements and said physical elements; and selecting one of said physical or logical elements, and using said links to identify all of the physical or logical elements that are linked to said selected one of said elements. For example, the step of establishing the logical data model includes the steps of: searching through the legacy application; and identifying selected ones of the physical elements of the legacy application as logical elements for the logical data model. Also, for example, wherein the step of establishing links includes the steps of: a user adding one of the links between the physical elements and the logical elements; and when said user adds said one of the links, using a software tool to identify additional candidate links between the physical elements and the logical elements.

BRIEF DESCRIPTION OF THE DRAWINGS

FIG. 1 shows an example program in a legacy language.

FIG. 2(b) illustrates links from a source code produced by an inference algorithm for the example of FIG. 1.

FIG. 3 illustrates an example of a cut inference that may be used in the implementation of this invention.

FIG. 5 shows inference rules for computing cuts and field equivalence relations.

FIG. 6 shows example programs with guarded typing solutions produced by an inference algorithm.

DETAILED DESCRIPTION OF THE PREFERRED EMBODIMENTS

Figure 2A:
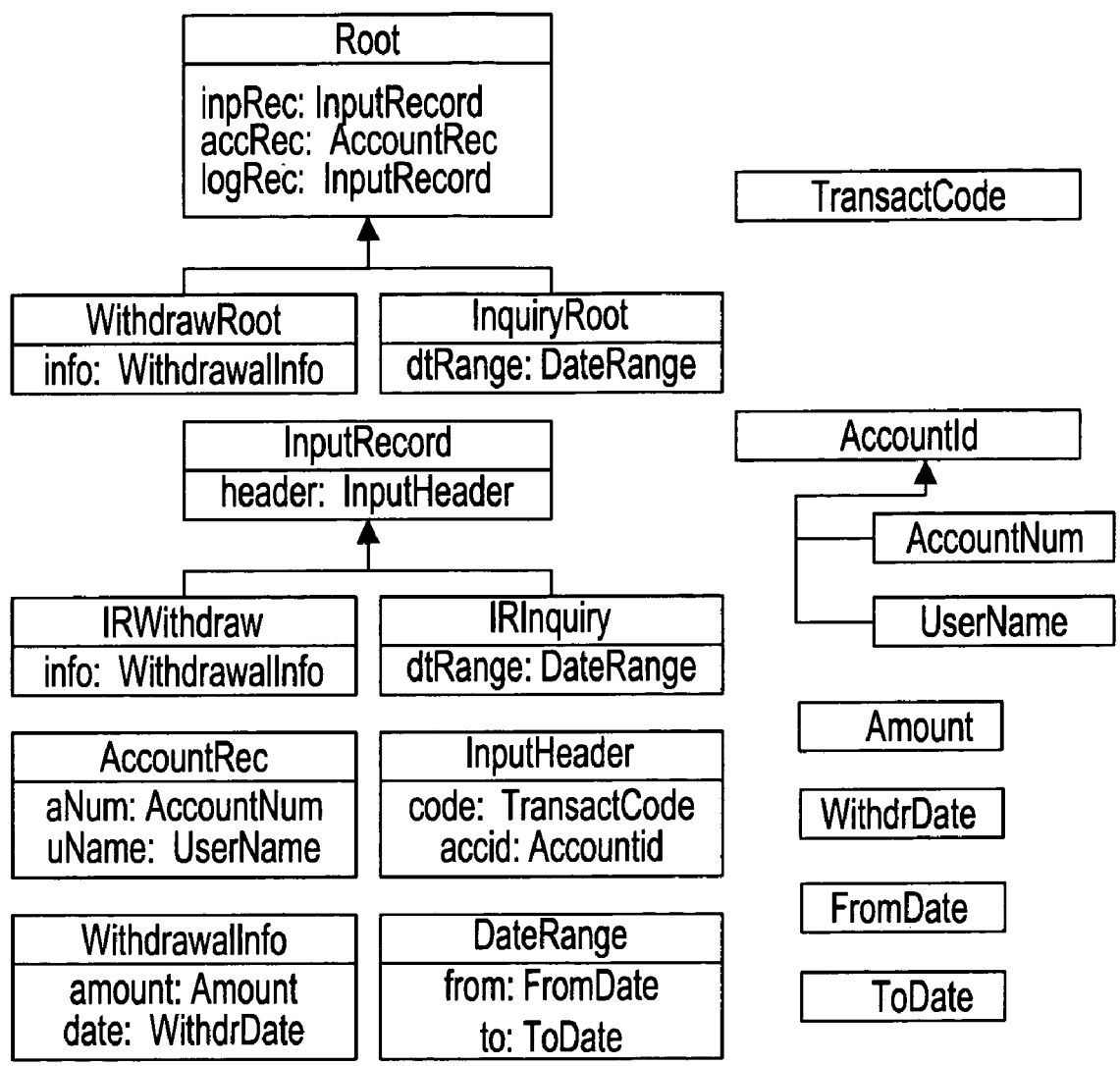
FIG. 2(a) shows an object-oriented model (OOM), drawn as a UML class diagram.

Despite myriad advances in programming languages since business computing became widespread in the 1950s, legacy applications written in weakly typed languages like Cobol still constitute the computing backbone of many businesses. Such applications are notoriously difficult and time-consuming to update in response to changing business requirements. This difficulty very often stems from the fact that the logical structure of these applications and the data they manipulate is not apparent from the program text. Two sources for this phenomenon are the lack of modem abstraction mechanisms in legacy languages, and the gradual deterioration of the structure of code and data due to repeated ad-hoc maintenance activities.

The present invention addresses the problem of recovering object-oriented data models from legacy programs, which can facilitate a variety of program maintenance activities by providing a better understanding of logical data relationships. The recovered models, similar to UML class diagrams, incorporate classes, which contain data fields, and inheritance relationships between classes. A key aspect of the preferred approach to constructing a data model is that it is based on an analysis of the code that manipulates the data, rather than an analysis of the declaration of the variables that store the data.

A second aspect of this invention is a (bisimulation-based) formal characterization of what it means for an object-oriented model to be a correct data model for a program. The preferred inference algorithm either produces correct models according to a given characterization, or fails to produce any model (this happens in certain unusual situations, as described below).

The present invention is illustrated herein using Cobol, but the preferred approach of this invention is applicable to other weakly typed languages (e.g., PL/I, 4GLs, and assembly languages) also.

Consider the example program in FIG. 1. This will be used as a running example to illustrate the key deficiencies of Cobol that hinder program understanding, as well as the working of our inference algorithm. (We actually use a variant of Cobol that incorporates a few deviations from the standard syntax for the purpose of clarity).

What do the declarations say? The initial part of the program contains variable declarations. Variables are prefixed by level numbers, e.g., 01 or 05, which serve to indicate nesting, akin to record-field relationships, among variables. Thus, account-rec is a structured variable (record) consisting of "fields" ar-acc-num, ar-user-name, and ar-data. Other variables in the example pre-fixed by level 01 are similarly structured variables. Clauses of the form PIC X(n) declare the corresponding variable to be of size n, meaning that it stores byte sequences of length n. The redefines clause used in the declaration of variable ir-acc-num indicates that it is an overlay of variable ir-user-name, i.e. that the two variables occupy the same memory locations.

What does the program do? The executable statements follow the data declarations. The program first reads a transaction record into input-record (in statement /1/). Next, the program uses the user name in input-record.ir-user-name to look up the corresponding account number (in statement /2/). (The READ . . . WHERE statement retrieves a record account-rec whose ar-user-name field equals ir-user-name from an indexed file.) Then, this account number is. copied to ir-acc-num (field names are used without qualification when there is no ambiguity); note that ir-acc-num and ir-user-name are overlays, so the user name gets overwritten. Next the transaction record's ir-trans-code field is checked; depending on whether the code indicates a "withdraw" or an "inquiry" transaction, the transaction data in ir-data is copied to the appropriate top-level variable (withdrawal-info or date-range), and then appended to a file (withdr-file or inquiry-file) for further processing. Finally, in statements /9/ and /10/, the first two fields in the transaction record are extracted (by copying the record to the top-level variable log-record, then appended to log-file.

What's missing? An examination of the program logic reveals the following facts:
the variable ir-data is not a scalar variable, but a structured variable.
ir-data is in fact a polymorphic variable—it stores values of different types.
ir-data stores values of the same type as date-range or values of the same type as withdrawal-info.
ir-user-name and ir-acc-num constitute a logically disjoint union—i.e., they are not used to refer to the same data even though they occupy the same memory locations; presented below is an example with a contrasting use of redefined variables.
variables ir-acc-num and ar-acc-num have the same type—i.e., they are used to store values from the same logical domain.
variables wi-amount and wi-date do not have the same type.

However, there is nothing in the variable declarations (except the variable names themselves, which can be an unreliable source of information) to give the user any hint about these facts. The key deficiency in Cobol that leads to these problems is that it has no type declaration mechanism. Naturally, there is no means to declare subtyping either.

The discussion presented immediately below shows that an object-oriented data model could be used to compactly convey all of the abovementioned facts, as well as other useful information. Furthermore, the inference algorithm presented below can automatically create this model by analyzing the program's logic.

Linked Object-Oriented Models

FIG. 2 contains the output of a preferred inference algorithm for the example in FIG. 1. FIG. 2(a) contains the object-oriented model (OOM), drawn as a UML class diagram. An OOM is comprised of a set of class definitions as usual: each class inherits from zero or more classes (its base classes), and has zero or more fields, while each field has a type which is a class. In FIG. 2(a) each box is a class, with its name at the top, and list of fields below; inheritance relationships are shown as arrows from the subclass to the base class. Classes such as Amount, WithdrDate, which have no explicit fields, are called atomic classes; they represent scalar values, and actually have one "implicit" field of type String not shown here. Note that the inference algorithm does not automatically generate meaningful names for classes and fields (the names in FIG. 2 were supplied manually for expository purposes); however, heuristics can be used to suggest names automatically based on the variable names in the program.

The object-oriented model is only one component of the inference algorithm's output. The second component is referred to herein as a link component. The link component is intended to connect the declared variables in the program to elements of the inferred model, to illustrate, among other things, the type of a declared variable. However, in general, a variable may be used with different types in different parts of the program, and the inference algorithm is capable of capturing such information. So, the link component actually connects variable occurrences in the program with elements of the inferred model. The object-oriented model together with the links form a linked object-oriented model (LOOM).

The discussion below explains what information the link component captures for every variable occurrence. A symbol such as ir-trans-code in the running example plays a role somewhat different from conventional program variables. It identifies a part of a structured datum. One could say that it plays the role of a field (in a class/record definition) as well.

Hence, the links capture, in addition to the type of a variable occurrence, a qualified access path (defined below) that identifies the part of a structured datum that the variable occurrence denotes.

It may be helpful to formally define the link component. A qualified field name is an ordered pair (C,f), which can also be denoted as C,f, which is comprised of a class C, and a field f in class C. If no confusion is likely, the class name C can be omitted when referring to a qualified field. A qualified access path ap is a sequence of one or more qualified field names $(C_1.f_1) \rightarrow (C_2.f_2) \ldots \rightarrow (C_k.f_k)$ such that for each $1 \leq i < k$: $C_{i+1}$ is equal to or is a derived class of the type of $C_i.f_i$.

The links in a LOOM take the form of a function L that maps each variable occurrence v in the program to an ordered pair $((C_1.f_1) \rightarrow (C_2.f_2) \ldots \rightarrow (C_k.f_k), C_{k+1})$ comprised of a qualified access path and a type $C_{k+1}$, where $C_{k+1}$ is equal to or is a derived class of the type of $C_k.f_k$. Such a link may be seen as making the following assertions about the program state when the statement containing the variable occurrence v executes, expressed, however, using the vocabulary of the object-oriented model:

the program's complete state (i.e., the contents of all variables put together) is of type $C_1$; referred to herein as object $O_1$ for each $1 \leq i < k$ the value stored in the $C_i.f_i$ field of object $O_i$ is of type $C_{i+1}$; referred to herein as object $O_{i+1}$ variable occurrence v refers to object $O_{k+1}$, which is of type $C_{k+1}$ (The preferred formalization of the LOOM semantics, discussed below, will clarify how to interpret the above assertions about the program's state expressed in terms of the model's vocabulary.)

FIG. 2(b) illustrates the links inferred by the algorithm for the running example. Each row in the table contains a variable reference v (the left column), v's access path (the middle column), and the type of v (right column).

Usefulness of LOOMs

LOOMs recovered by the algorithm make explicit the data abstractions that programmers use implicitly when writing programs in weakly typed languages. As a result, LOOMs enhance program understanding, facilitate certain program transformations, and can serve as a basis for porting such programs into newer object-oriented languages that allow the abstractions to be made explicit. These advantages are illustrated below using the running example.

OOM by itself is valuable. It may first be noted that just the object-oriented model (e.g., in FIG. 2(a)) gives a valuable overall summary of the logical data domains manipulated by the program, and the relationships (nesting as well as inheritance) between them. This enhances program understanding.

Subtyping. The occurrence of input-record in statement /1/ has type InputRecord. InputRecord has two subtypes, IRWithdraw and IRInquiry. This means that values belonging to two logical domains—withdraw transactions and inquiry transactions—reside in input-record at statement /1/.

Base class factoring. Though the data stored in input-record belongs to one of two logical domains, some of this data is common to both logical domains. This common data has been lifted to the base class InputRecord (as field header), while the data that is unique to the two logical domains are modeled as fields of the corresponding derived classes.

Record structure of a declared scalar. ir-data is declared as if it were a scalar variable 12 bytes long. However, the LOOM shows that its type in statement /5/ is WithdrawalInfo, which is a class with fields. This means ir-data actually stores a value that is logically record-structured, in spite of the declaration to the contrary. Redefinitions. ir-user-name and ir-acc-num are overlays. They are disjointly used, in the sense that both variables are never used to access a single runtime value. The LOOM makes this explicit by giving the occurrences of these two variables (in statements /2/ and /3/) different types (UserName and AccountNum, respectively). Had they been used non-disjointly (e.g., by writing a value into ir-user-name and then reading the same value via ir-acc-num) they would have been assigned the same type.

Impact analysis. Consider the following two toy programs that use the same variables r and s:

| Variables | | Program 1 | Program 2 |
|---|---|---|---|
| 01 r. | 01 s. | READ r. | READ r. |
| 05 r1 pic x. | 05 s1 pic x. | MOVE r TO s. | MOVE r1 TO s1 |
| 05 r2 pic x. | 05 s2 pic x. | WRITE s1. | MOVE r2 TO s2. |
| | | | WRITE s1. |

Observe that it is possible to reorder the fields of record s or add fields to s in program 2, without affecting the program's behavior. The same is, however, not true for program 1. This is clearly very useful information from a program maintenance perspective. The models inferred herein for these programs capture this information. For Program 1 the algorithm gives the same type (a class C) to all occurrences of r and s. On the other hand, for Program 2, the algorithm gives the occurrence of r a type $C_1$ and the occurrence of s a different type $C_2$; $C_1$ and $C_2$ both have two fields, and the corresponding fields in the two classes have the same type. The fact that r and s are given the same type in Program 1 means that they are tightly coupled with respect to their internal representations. Thus, the inferred model can assist in impact analysis: i.e., understanding the impact of a proposed change in the program.

Improved Program Analysis Apart from its use for program understanding, a LOOM can also be used as the basis for more precise static program analysis. E.g., many analyses tend to lose precision in the presence of redefinitions since they do not distinguish between the different variables occupying the same memory location (for the sake of conservativeness). The LOOM can indicate when it is safe to treat such variables separately.

Correctness of LOOMs

As observed above, a LOOM can capture information about the semantics aspects of a program. How can the notion of a LOOM being correct for a program be formalized? Consider the following example:

| Variables | Program 1 | Program 2 |
|---|---|---|
| 01 r1 pic x(10). | READ r1. | READ r1. |
| 01 r2 redefines r1 pic x(10). | WRITE r1. | WRITE r2. |
| | READ r2. | |
| | WRITE r2. | |

In the above example, r1 and r2 occupy the same memory locations, due to the redefinition clause in the declaration of r2. Note that the redefinition is not essential to program 1: if the declaration is changed so that the two variables occupy disjoint memory locations, program 1's execution behavior will not be affected. In contrast, if the redefinition is omitted, program 2's behavior will be affected. Specifically, the WRITE statement will now write out the initial value of r2 as opposed to the value read in the first statement.

It follows from the above explanation that it would be reasonable (and natural) for the LOOMs for the above two programs to be different. This idea serves as the basis for the preferred approach to defining a notion of correctness of LOOMs. A LOOM for a program may be seen as describing an alternative way to represent data during the program's execution. Hence, a LOOM can be defined to be correct for a program if the program's "observed execution behavior" does not change if the alternative data representation determined by the LOOM is used during program execution.

The rest of the paper is structured as follows: We describe our algorithm in Section 2. Section 3 specifies the alternate execution semantics based on the LOOM, as well as the correctness characterization for LOOMs.

Logical Model Inference Algorithm

Presented below is an outline of the preferred algorithm using the running example to informally illustrate the main aspects of the algorithm. Then a more detailed description of the algorithm in is presented.

Overview and Illustration of Algorithm

Below is an Outline of the Steps in the Algorithm:

Step 1: First, compute a set of cuts, where a cut identifies a certain range of memory locations at a certain program point (under certain conditions) that must be represented in the inferred data model, using a bidirectional dataflow analysis. Specifically, the procedure is to create classes and fields to model the data represented by each cut. Since cuts identify ranges, there is a natural notion of nesting between ranges. The class corresponding to a cut will contain fields corresponding to the cuts immediately nested inside it. Thus, the cuts are the bits and pieces used to construct an OOM.

Step 2: Next, identify the relationships that must exist between the classes and fields created to represent these cuts. Specifically, infer certain equivalence relations between cuts. A class equivalence relation identifies cuts that must be modeled using the same class. A field equivalence relation, which is more powerful, helps identify cuts that should be represented using the same field. Field equivalence helps identify partial equivalence between classes. Specifically, a field-equivalence between a field $f_1$ of class $C_1$ and a field $f_2$ of a class $C_2$ indicates that the two fields must be lifted into a common base class of $C_1$ and $C_2$.

Step 3: Step 3 is to convert the set of candidate classes and candidate fields (as determined by the set of inferred cuts) into a class hierarchy (the OOM) by factoring equivalent fields into appropriate base classes (after creating the necessary base classes).

Step 4: Then identify for every variable occurrence, its type as well as its access path in the OOM to create the links.

Step 5: Finally, apply a set of (optional) rules to simplify the OOM. The running example is used below to informally illustrate some of the main aspects of the preferred algorithm.

Step 1: Inferring Cuts

Note that every variable corresponds to a range of memory locations: e.g., in the running example, ir-user-name corresponds to the range [2, 9], while input-record itself corresponds to the range [1,21]. We now introduce some graphical notation to illustrate cut inference. Consider FIG. 3, which focuses on statements /5/ and /6/ as well as the program points preceding them. The "boxes" labeled $B_{5,w}$ and $B_{6,w}$ are associated with the program points before statement /5/ and statement /6/ respectively. The boxes represent the entire range of memory locations used by the program. For purposes of illustration in the figure we show only a portion of the two boxes, the portion corresponding to top-level variables input-record and withdrawal-info. Cuts are shown in FIG. 3 using pairs of dashed vertical lines, with both lines having the same label. The discussion below shows how these cuts are inferred. The thin arrow on the left, with the MOVE statement as its label, between the boxes is referred to as a transition edge. It indicates that the program state represented by box $B_{5,w}$ transitions to a program state represented by the box $B_{6,w}$ by executing the MOVE statement. The bold arrow is a value-flow edge. Value-flow edges exist between boxes that precede and succeed a MOVE statement; a value-flow edge has a source interval in the preceding box (corresponding to the source variable of the MOVE), and a target interval in the succeeding box (corresponding to the target variable of the MOVE).

We now illustrate cut inference. First, we infer initial "seed" cuts from the set of variables used and defined in each statement. For each variable used in a statement, a cut is created for the range corresponding to this variable at the program point preceding the statement; for variables defined in a statement, similar cuts are created in the program points before and after the statement. This ensures, as discussed later, that the inferred model contains a field and class to which these variable occurrences can be linked. Consider statement /5/: We infer a cut corresponding to the range of ir-data at the program point before statement /5/ and a cut corresponding to the range of withdrawal-info at the program points before and after statement /5/. These are shown as cuts labeled 3! and 7! in FIG. 3 (we use "!"s to denote seed cuts).

Next, infer more cuts by "propagating" already inferred cuts. Some of the cut propagation rules are based on value-flow. The intuition here is that the "structure" of structured-data (i.e., the set of classes and fields used to model the data) does not change if the program does not modify the data, and cuts are used to represent the structure of data. Hence, whenever we can determine that data at some range $r_1$ at a program point is present unmodified at the same or some other range $r_2$ at an adjacent program point, and a cut exists within range $r_1$ in the first program point, we can infer a corresponding cut within range $r_2$ at the second program point. Hence, if a statement assigns a new value to a range, then any cut in the box that precedes (succeeds) this statement that does not overlap the overwritten range is propagated to the box that succeeds (precedes) this statement. In the example in FIG. 3, cut 4 is propagated from $B_{6,w}$ to $B_{5,w}$, and cut 3 from $B_{5,w}$ to $B_{6,w}$, in this manner. Similarly, a cut inside the source (target) interval of a value-flow edge is propagated to the target (source) interval. In the example, cuts 1 and 2 in $B_{6,w}$, which are originally inside the target interval of the value-flow edge, are propagated to the source interval of that same edge in box $B_{5,w}$.

Another cut propagation rule is based on supercut flow. If a statement assigns a new value to a range, then any cut in the box that precedes (succeeds) this statement that completely contains the overwritten range is propagated to the box that succeeds (precedes) this statement. This rule can be understood by viewing the "supercut" as representing an object, and the assignment as updating the value of a (possibly transitive) field of the object. Hence, the object will exist both before and after the statement execution. In contrast, any cut that is completely contained within overwritten range before the statement will not be propagated. (As discussed later, if a cut partially overlaps the overwritten range, the algorithm will halt.)

Besides boxes for program points, the preferred approach of this invention also introduces a box for each data-source statement; these are statements that create new values in a program (e.g., READ statements, assignments of constants or arithmetic expressions to variables), as opposed to MOVE statements that simply copy existing values. The data-source box, representing the new value created at the data-source statement, is an interval whose size is the same as that of the variable being defined, and has a value-flow edge flowing out of it to the interval corresponding to the target variable of the data-source statement in the program-point box that follows the data-source statement. Cut propagation along these value-flow edges happens just as described above.

Value Partitions and Exploded CFGs

As discussed above, simple cuts are those that correspond to a range at a program point. In general, however, we will get a less satisfactory model if we treat all data that resides in a certain range (of memory locations) at a certain program point uniformly (i.e., if we use a single class to describe all this data). Consider the running example. It follows from our description of the program's logic that the variables input-record and ir-data actually store different "types" of data for a "withdraw transaction" and an "inquiry transaction". A better model is obtained by creating separate classes to describe the data corresponding to these two cases.

This is achieved by generalizing the concept of a cut so that it can describe the data stored in a certain range of memory locations at a certain program point under certain conditions, as follows.

A value partition of a program is a mapping of each program point u and each data-source statement u to a finite set of predicates $\mu(u)$ (known as the value partition at u); for a program point its predicates refer to variables in the program, while for a data-source statement its predicates refer to the variable defined at that statement. Further, for any program state that can arise at a program point u, $\mu(u)$ must contain at least one predicate that the program state satisfies; similarly, for any value generated by a data-source u, $\mu(u)$ must contain at least one predicate that the value satisfies. (Strictly speaking, we require the set of predicates in $\mu(u)$ to only cover the state spaces arising at u, not partition them; still, partitions would often make sense in practice, and hence we continue to call $\mu(u)$ a "value partition").

Consider the running example in FIG. 1. Here is a candidate value partition for this example, using the shorthand notation w for the predicate ir-trans-code='w', and the notation i for the negation of this predicate:

{w, i} for all program points that are after statement /1/ and outside the "if" statement, as well as for the data-source statement /1/.

{true} for the program point before statement /1/ as well as for the data-source statement /2/.

{w} for the program points inside the "then" branch of the "if" statement.

{i} for the program points inside the "else" branch.

At a high-level, the preferred approach is to (1) compute a suitable value partition for the given program, (2) construct an exploded graph using the value partition (as described below), wherein each program point u and each data-source u is represented by several boxes, one for each predicate in $\mu(u)$, and (3) apply all five steps of the inference algorithm (as outlined above) to this exploded graph. By having multiple boxes at a single program point or single data-source for inferring cuts pertaining to distinct logical domains, we produce better models. We will later describe how a suitable value partition can be computed for a program.

Figure 4:
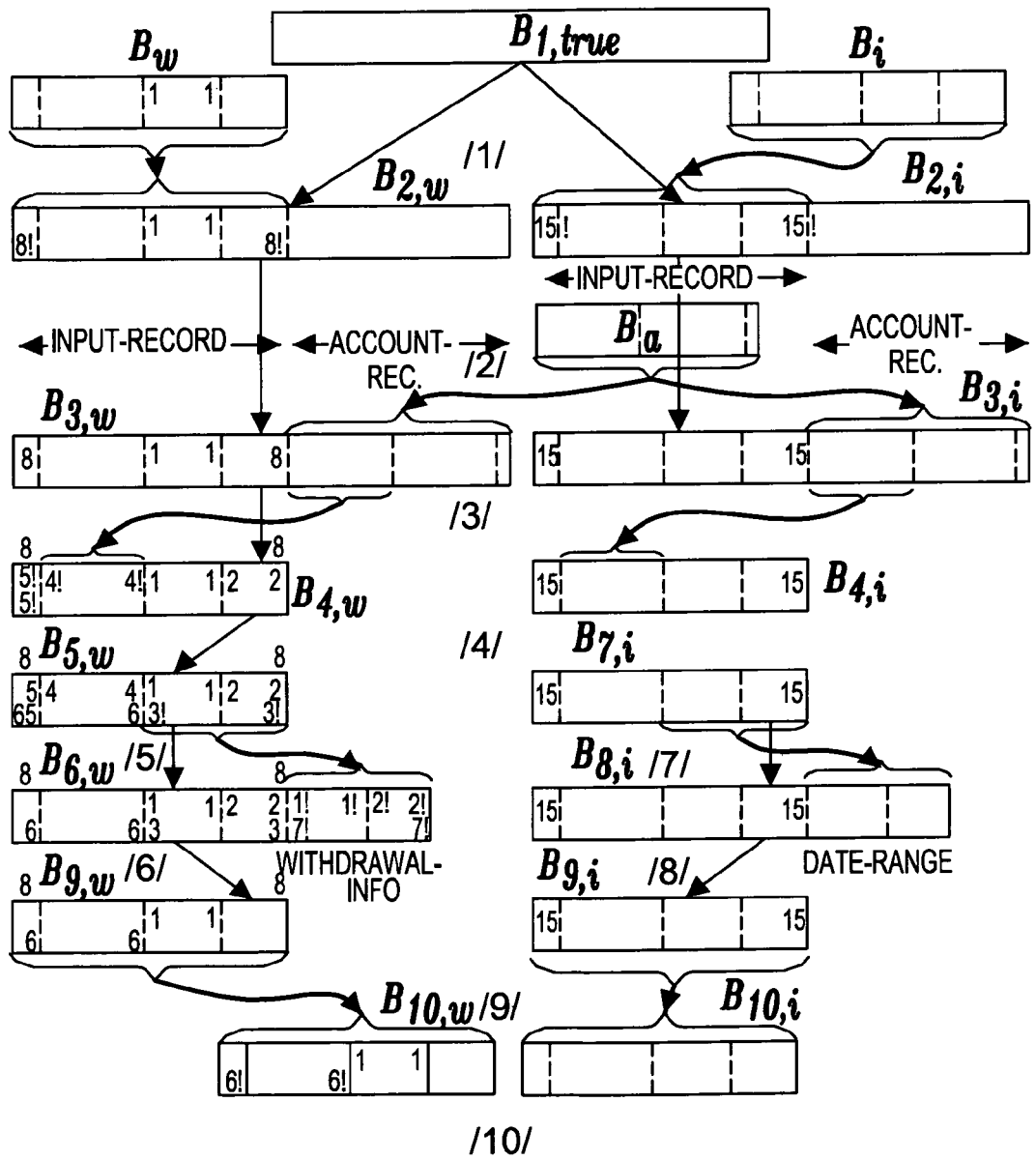
FIG. 4 is an exploded graphical representation of the program of FIG. 1, with cuts produced by an inference algorithm.

FIG. 4 shows the exploded graph for the running example derived from the value partition given above. Boxes $B_w$ and $B_i$ (at the top of the figure) are for the data-source statement /1/, and correspond to predicates w and i, respectively, while box $B_a$ is for the data-source statement /2/. Each program-point box is labeled $B_{n,x}$, where n in the number of the statement that follows the program point to which the box pertains, and $x \in \{w, i, true\}$ is the predicate to which the box corresponds in the value partition at that program point. As in FIG. 3, only certain interesting portions of the boxes are shown, not the entire boxes.

The two types of edges in the exploded graph are added as explained above, but under additional constraints: (a) an edge (transition or value-flow) is created from a program-point box $B_j$ to a program-point box $B_k$ only if there exists a program state that satisfies $B_j$'s predicate that is transformed by the statement intervening between these two boxes into a state that satisfies $B_k$'s predicate, (b) a value-flow edge is created from a data-source box $B_j$ to a program-point box $B_k$ only if the conjunction of the predicates of the two boxes is not false.

As a consequence of rule (a) above, edges between program-point boxes in FIG. 4 flow from "w" boxes to "w" boxes, and from "i" boxes to "i" boxes, but not across these categories. As a consequence of rule (b), the value-flow edge out of data-source box $B_w$ goes to $B_{2,w}$, while the value-flow edge out of $B_i$ goes to $B_{2,i}$.

The initial cut creation works on the exploded graph as described above, with the extension that a variable reference causes cuts to be created in all boxes in the program point preceding/succeeding (as appropriate) the statement that contains the reference. Cut propagation works as described above; in particular, are propagated cuts from one box to another only if there is an edge between them. This means, e.g., that no cuts are propagated from "w" boxes to "i" boxes, or vice versa, in the example in FIG. 4, resulting in a better model.

FIG. 4 contains all the cuts for the running example after cut propagation is over (some of those cuts have been labeled for illustrative purposes).

Step 2: Inferring Class and Field Equivalences

As mentioned earlier, each cut c in each box is a candidate class C for the OO model. Each smaller cut d nested immediately inside c (i.e., d is a "child" of c) corresponds to a field of class C, and the type of that field is the candidate class corresponding to d. However, we cannot simply create these classes and fields, e.g. for cuts in two different boxes, independently of each other. In this step, we identify the constraints between these classes and fields that a correct model preferably must satisfy.

Class equivalences. Here, we identify certain corresponding cuts in adjacent boxes connected by edges in the exploded graph, and add a class equivalence constraint between the corresponding cuts, which indicates that the corresponding cuts should be modeled by the same class in the model. Consider the two program points and boxes in FIG. 3. Firstly, all cuts that are obtained by propagation from the same cut correspond. That is, the three cuts (in the two boxes) labeled 1 correspond, the two cuts labeled 3 correspond, etc. The intuition is the same as for the cut propagation. Similarly, a class equivalence constraint is added between entire boxes related by a transition edge (a program-point box can be thought of as an outermost-level cut), unless the intervening statement overwrites the entire memory. The reasoning for this is similar to that for the "supercut flow" rule explained above.

Field equivalences. Consider the reference to ir-trans-code in the conditional test labeled /4/ in the running example. The value partition at the program point before this predicate is comprised of two elements, as represented by the two boxes $B_{4,w}$ and $B_{4,i}$. As explained earlier that the basic idea is to create distinct classes, say C1 and C2, to describe the data represented by these boxes. Note, however, that the program makes a reference to ir-trans-code, after this program point, regardless of which box the program state corresponds to. We treat this as an indication that ir-trans-code is common to both classes $C_1$ and $C_2$—i.e., that it really is part of a common base class of these two classes. We generate a field equivalence constraint between the cut corresponding to ir-trans-code in $B_{4,w}$ and $B_{4,i}$ to capture this requirement.

It turns out that a class equivalence constraint between two candidate classes is expressible equivalently as a set of field-equivalence constraints between all the corresponding fields of the two classes; therefore, field equivalences are used to represent both individual field equivalences as well as class equivalences in the preferred approach.

Step 3: Generating the Object-Oriented Model

The input to this step is a set of candidate classes, and an equivalence relationship on the candidate-class fields. The goal of this step is to initially treat all candidate classes as leaf classes (inheritance wise), and then create appropriate new base classes such that each equivalence class of fields in the leaf classes is unified into a single field and pulled up to one of the new base classes that is a superclass of all the leaf classes from which the fields were pulled. The details of how the above step is done (using concept analysis) are given below. For an illustration, consider the cuts labeled 3 in boxes $B_{5,w}$ and $B_{6,w}$. The candidate classes corresponding to each of these two cuts has two fields, corresponding to cuts 1 and 2. However, as explained above, the two "1" fields in these two classes are field equivalent, as are the two "2" fields. Therefore, both fields are pulled up to a base class, WithdrawalInfo (see FIG. 2(a)), which means the two (leaf) candidate classes disappear entirely.

Steps 4 & 5: Link Generation and Model Simplification

Link generation is discussed in detail below, but an example is provided herein. Consider the reference to variable ir-data in statement /5/ in FIG. 1. Let ap be the qualified access path of this reference (we wish to generate ap). This reference corresponds to the cut labeled 3 in box $B_{5,w}$ in FIG. 4. (If there had been multiple boxes at the point preceding statement /5/, we could have used any one of them, and due to the field-equivalence constraints generated in Step 2, we would have generated the same access path). We now visit the cuts it is nested in, from outside to inside, and concatenate their representative fields to create ap: the outermost cut that contains cut 3 is numbered 8, and corresponds to a field (the first field) of the candidate class that corresponds to box $B_{5,w}$. The representative of this field in the model, namely Root.inpRec in FIG. 2(a), becomes the first field in ap. Next, cut 3 corresponds to a field of the candidate class corresponding to cut 8; the representative of this field in the model is IRWithdraw.info. Therefore, ap=Root.inpRec→IRWithdraw.info (this is exactly what is shown in the row beginning with ir-data:5 in FIG. 2(b)).

Finally, we apply a few straightforward rules for simplifying the OO model generated in the previous step, which we discuss below.

Terminology and Notation

We introduce here the formal notation and terminology that we use below. We assume that the program is represented by a control-flow graph whose vertices denote program points and edges are labeled with statements. Any conditional test P is represented by a statement "Assume P" labeling the true branch and a statement "Assume !P" labeling the false branch. We will use the notation $$u \xrightarrow{S} {}_c v$$

to denote an edge from u to v labeled with the statement S. We address a subset of Cobol, which we call MiniCobol. MiniCobol incorporates the abovementioned Assume statement, READ statements, MOVE statements, and WRITE statements (as these statements suffice to illustrate all aspects of the algorithm). The term variable occurrence is used to denote an occurrence of a variable in the program.

We will refer to READ statements as well as assignment statements that assign a constant value to a variable as a data-source statement. We refer to any use of a variable in a statement other than a MOVE statement as a data-sink. Note that during program execution, values are generated by data-sources, and then copied around by MOVE statements, and eventually used at data-sinks. (Thus, the algorithm can be easily extended to handle Cobol's computational statements such as COMPUTE X=Y+Z by treating the Y and Z as data-sinks, and the statement itself as a data-source). If u is a data-source statement, let |u| denote the size of the variable that is assigned a value in statement u.

Every variable in the preferred language occupies a consecutive set of byte sized memory locations [i, j], which we refer to as the range corresponding to the variable. Given a statement S, let refs(S) denote the set of ranges corresponding to variables referred to in that statement, and let defs(S) denote the set of ranges corresponding to variables that are assigned a value in statement S. For MiniCobol, defs(S) will contain at most one element. We also define lval(S) to be unique element of defs(S) if defs(S) is non-empty, and the empty range $\Phi$ otherwise. We say that $[i_1, j_1] \subset [i_2, j_2]$ if range $[i_1, j_1]$ is properly contained within range $[i_2, j_2]$: i.e., if $i_2 \leq i_1$ and $j_1 \leq j_2$ and $[i_1, j_1] \neq [i_2, j_2]$. Similarly, we use $r_1 \cap r_2 = \Phi$ to indicate that the ranges $r_1$ and $r_2$ are disjoint.

The size |R| of a variable R is the sum of the size of all of its fields (excluding the fields that have redefines clauses). Let M denote the size of the total memory used by the given program, which is the sum of the sizes of its 01-level variables. The range [1,M] represents the total memory used by the program. Let $\mu$ denote a value partition for the program (see above). We use the term box to denote an ordered pair (u,P) where u is a program point or datasource statement and $P \in \mu(u)$, and use the symbols $B_i$ to refer to boxes. The length of a box $B=(u,P)$, denoted $|B|$, is defined to be M if u is a program point and $|R|$ if u is a data-source statement that assigns to variable R. We define range [B] to be $[1, |B|]$.

We define a relation $$\xrightarrow{S},$$

representing the transition edges between boxes described above, as follows: let $B_1=(u,P_1)$ and $B_2=(v,P_2)$; we say $$B_1 \xrightarrow{S} B_2 \text{ iff } u \xrightarrow{S} {}_cv$$

and there exists a program state satisfying $P_1$ that the execution of S transforms into a state satisfying $P_2$.

We will use the notation (B,r) to identify an ordered pair comprised of a box B and a range r. We define a relation $\Rightarrow$ on such pairs, a formal representation of the value-flow edges between boxes (see above), as follows. Let $B_1=(x,P_1)$ and $B_2=(v,P_2)$. We say $(B_1, r_1) \Rightarrow (B_2, r_2)$ iff: either x is a data-source statement, $$\xrightarrow{x} {}_cv, P_1 \wedge P_2 \neq \text{false},$$

$r_2 \in \text{defs}(x)$ and $r_1 = [1, |r_2|]$, or x is a program point, $$x \xrightarrow{S} v,$$

S is a MOVE statement, $r_1 \in \text{refs}(S)$, and $r_2 \in \text{defs}(S)$.

Computing a Value Partition

The constant-valued function $\mu$ defined by $\mu(u)=\{\text{true}\}$ for all program points and data-sources u is a trivial value partition. This leads to an exploded graph with a single box to be used at all program points and data sources, which means the model will not use distinct classes (subtypes) to describe values corresponding to distinct logical domains.

The type inference algorithm described in [3] can be used to produce a better value partition as follows: This algorithm produces for every program-point u a set of union-free types $\Gamma(u)$ that describe the set of all program-states at that program-point. It also produces, for every data-source statement S, a set of union-free types $\Gamma(S)$ that describe the set of all values produced by that data-source statement. Every union-free type f has an associated predicate pred(f). The function $\mu$ defined by $\mu(x)=\{\text{pred}(f)|f \in \Gamma(x)\}$ is a suitable value partition.

In the discussion given below, we will assume that we are given the set of boxes, as well as the relations $$\xrightarrow{S}$$

and $\Rightarrow$ on the boxes. We note that our inference algorithm is correct as long as we use any conservative over-approximations of these relations.

The Model Inference Algorithm

This section contains a formal presentation of the model-inference algorithm, an overview of which was provided above.

Steps 1 & 2: Inferring Cuts and Equivalences. In this step, we infer a set cuts(B) of ranges, for every box B, as well as field equivalences between cuts. For every r in cuts(B), we define parent(B,r) to be the smallest range r' in cuts(B) $\cup$ {range [B]} such that $r' \supset r$. (For now, let us assume that the parent of a range r in cuts(B) is well-defined. We will later discuss the case when the set $\{r' \in \text{cuts}(B) \cup \{\text{range }[B]\}|r' \supset r\}$ does not have a smallest range, which we expect to happen only rarely in practice).

An inferred range r in cuts(B) denotes several things. First, it identifies that the inferred model should include a class to represent <B,r>, which we will denote by C<B,r>. Second, it also has to be modeled as an explicit field of C<B,parent<B, r>>, which we denote by F<B,r>. Finally, such a cut also identifies an implicit field of class C<B,r>, which we denote by I<B,r>, which represents the data in the range r not accounted for by the explicit fields of C<B,r>.

The inference rules in FIG. 5 show how we infer the cuts (ranges in cuts(B)), as well as two binary relations $\sim_f$ and $\sim_i$ on the cuts that represent field equivalence. The relation $<B_1, r_1> \sim_f <B_2, r_2>$ represents field equivalence between the fields $F<B_1,r_1>$ and $F<B_2,r_2>$, while the relation $<B_1,r_1> \sim_i <B_2,r_2>$ represents field equivalence between the fields $I<B_1,r_1>$ and $I<B_2,r_2>$. We use the shorthand notation $c_1 \approx c_2$ to indicate that $c_1 \sim_f c_2$ and $c_1 \sim_i c_2$.

At the end of this step, we check to see that for each box B, and each pair of cuts $r_1$ and $r_2$ in cuts(B), $r_1$ and $r_2$ are either disjoint or one is contained completely within the other. If this condition does not hold, our model inference algorithm halts with failure. Informally, this failure situation indicates that the program contains references to two overlapping sub-ranges of the same data; we expect this to happen rarely in practice, and note that modeling it would require a more complex and less intuitive version of a link that can associate a variable occurrence to a sequence of access paths (as opposed to a single access path).

Step 3: Generating the Class Hierarchy. For each box B and for each range $r \in \text{cuts}(B)$, the cut (B,r) defines a candidate class. We use CCS to denote the set of all candidate classes. The cuts also help define the set of fields CF(C<B,r>) in candidate class C<B,r>, as shown below.

CCS=$\{C<B,r>|B$ is a box, $r \in \text{cuts}(B) \vee$ r=range [B]$\}$ parent<B,r>=smallest range $r' \in \text{cuts}(B) \cup \{\text{range }[B]\}$ such that $r' \supset r$ childcuts(B,r)=$\{r_1 \in \text{cuts}(B,r)|r=\text{parent}<B,r_1>\}$ CF (C<B,r>)=$\{F<B,r_1>|r_1 \in \text{childcuts}(B,r)\} \cup$
 $\{I<B,r>|\exists r_1 \text{ s.t. } r_1 \neq \Phi \wedge r_1 \subset r) \wedge$
 $\{\forall r_2 \in \text{childcuts}(C,r): r_2 \cap r_1 = \Phi\}$ We utilize the inferred cut equivalence relations $\sim_f$ and $\sim_i$ to define an equivalence relation $\sim$ on fields: we say that $F<B_1, r_1> \sim F <B_2,r_2>$ if $<B_1,r_1> \sim_f <B_2,r_2>$. As explained above, if we have two candidate classes $C_1$ and $C_2$, and fields $f_1 \in CF(C_1)$ and $f_1 \in CF(C_2)$, such that $f_1 \sim f_2$, then we need to create a common base class B for $C_1$ and $C_2$, and create a single field f in B that represents both $f_1$ and $f_2$.

We use concept analysis [9] to create a class hierarchy that respects the above field equivalences. Concept analysis is a general technique for hierarchically clustering entities that have shared features. The input to concept analysis is a triple (O, A, R), where O and A are finite sets of objects and attributes, respectively, and R is a binary relation between O and A. We say that object $o \in O$ features attribute $a \in A$ if (o,a)∈R. A triple (O, A, R) uniquely identifies a set of concepts, which can be automatically generated using concept analysis. A concept is a pair (X,Y) such that X is a set of objects (a subset of O), Y is a set of attributes, X is exactly the set of all objects that feature all attributes in Y, and Y is exactly the set of all attributes featured in all objects in X; X is called the extent of the concept and Y is called the intent of the concept. Concepts are partially ordered under an ordering $\leq_R$, defined as follows: $(X_0,Y_0) \leq_R (X_1,Y_1)$ iff $X_0 \subseteq X_1$. In fact, this partial order induces a complete lattice on the concepts, known as the concept lattice.

Before proceeding, we introduce some terminology. Let CFS={f|f∈CF(C)∧C∈CCS} be the set of all fields in all candidate classes. The equivalence relation ~ on the candidate-class fields partitions CFS into a set of equivalence classes. For each equivalence class ec we define candTypesOf(ec) ={C<B,r>|F<B,r>∈ec}. We create input for concept analysis as follows: Each candidate class C∈CCS becomes an object for the concept analysis. Each equivalence class ec of CFS defines two attributes repOf(ec) and typeOf(ec). Intuitively, repOf(ec) is the field in the final OO model that represents all candidate-class fields in ec, and typeOf(ec) is its type. Therefore, we define the candidate classes (i.e., concept-analysis objects) in the set {C|C∈CCS∧∃f∈CF(C) s.t. f∈ec} as featuring repOf(ec), and define the candidate classes in candTypesOf(ec) as featuring typeOf(ec). At this point, we apply concept analysis. Each resulting concept $con_1$ becomes a class classOf($con_1$) in the model; for each concept $con_2$ such that $con_1 \leq_R con_2$ and there exists no concept $con_3$ satisfying $con_1 \leq_R con_3 \leq_R con_2$, classOf($con_1$) is made a direct subclass of classOf($con_2$). For each candidate class C∈CCS its representative [C] in the model is defined as classOf($con_4$), where $con_4$ is the concept whose intent is equal to {repOf(f)|f∈CF (C)}. For each equivalence class ec we place the field $f_{ec}$=repOf(ec) in the class classOf($con_5$), where $con_5$ is the concept whose extent is the set {C|C∈CCS∧f∈CF(C) ∧f∈ec}; if candTypesOf(ec) is non-empty then we set the type of $f_{ec}$ to be the "lowest common" base class of the classes {[C]|C∈candTypesOf(ec)}, else we set its type to be a primitive string (f is an "implicit" field which is not directly referred to in the program). For all f∈ec we let [f] denote $f_{ec}$.

Step 4: Generating Links. As explained above, the link component of the LOOM consists of a map from variable occurrences in the program to qualified access-paths. Consider any variable occurrence v in S, and r be the range in memory corresponding to v. Let $$B_1 \xrightarrow{s} B_2$$

be some transition. If v is the target of a datasource or a MOVE then it is linked to the qualified access-path corresponding to F<$B_1$,r>, else it is linked to the qualified access-path corresponding to F<$B_2$,r>. Our class hierarchy construction guarantees that this access path is independent of transition $$B_1 \xrightarrow{s} B_2$$

that is chosen.

We now explain how to generate the access path of any field F<B,r> that corresponds to a variable occurrence v. Clearly r∈=cuts(B). Let r'=parent <B,r>. Let B be the class in the OOM that contains the field [F<B,r>]. We define the qualified field corresponding to F<B,r> to be B. F[<B,r>]. The qualified access-path to F(B,r) is obtained (recursively) as follows: if parent F<B,r>=range [B], then the qualified access-path to F<B,r> consists of just the qualified field corresponding to F<B,r>; otherwise, the qualified access-path is obtained by concatenating the access-path to parent<B,r> with the qualified field corresponding to F<B,r>.

Step 5: Model Simplification. Finally, we eliminate certain irrelevant parts of the model by applying the following rules repeatedly until no changes occur:

Remove a field from the model if it does not occur in any access path (in the link component) and does not correspond to any interval in a box that contains live data (we omit the definition of liveness for conciseness).

Remove a class if it does not occur in any access path and has no derived classes If a class C has no fields and one derived class D: eliminate C, replace all occurrences of C in fields and access paths with D, and make D a subclass of the base classes of C.

Note that this is an optional step, not required for correctness, but for producing models that are more suitable for program understanding and maintenance tasks.

Correctness Characterization for LOOMs

MiniCobol is a weakly typed language that uses an untyped data representation. All runtime values (the values of variables as well as the value of the whole program state) are simply strings. An OOM defines an universe O of strongly typed values. As we show later, the link component of a LOOM can be used to execute Mini-Cobol programs using this universe of strongly typed values. This execution halts if the value that arises at any context (during execution) is not of the type expected in that context. Thus, a LOOM determines an alternate semantics for a given program.

We say that a LOOM is correct for a program if the program's execution, under the alternate semantics determined by the LOOM, is "equivalent" to the program's execution under the standard semantics. What does it mean for these two executions to be "equivalent"? First, the program execution must follow the same path through the program in both cases. Second, the value of each datasink in the corresponding execution of a statement in both cases must be the same.

Given a program P and input I, let trace(P, I) denote the sequence $(S_1,m_1) \ldots (S_k,m_k)$ where $S_i$ denotes the i-th statement executed by P on input I, $m_i$ denotes a map from the data-sinks in statement $S_i$ to their values during the execution of $S_i$, and $S_k$ is the last statement executed, all under the standard semantics. (Note that the "input" to a MiniCobol program is the contents of the set of files that are read by the program).

Next, we present a similar definition for the alternate semantics by a LOOM. However, the claim we made above that a LOOM determines an alternate semantics is not completely accurate. A LOOM does not have all the information necessary for defining the alternate semantics. The missing piece is something referred to as a serialization model and it indicates how to convert strings into typed values (at a datasource statement) and vice versa (at a data sink). We note that it is straightforward to extend the algorithm to generate a serialization model as well. A formal definition of a serialization model (a, g) is presented below.

Given a LOOM L for P and a serialization model (α,γ), we define $trace_{L,(\alpha,\gamma)}$(P, I) just as trace(P, I) was defined, except using the alternate semantics determined by L and (α,γ).

DEFINITION 1. A LOOM L is said to be correct for a program P if there exists a serialization model $(\alpha,\gamma)$ such that, for any input I, $\text{trace}_{L(\alpha,\gamma)}(P, I) = \text{trace}(P, I)$.

THEOREM 1. For any program P, if our inference algorithm produces a LOOM L, then L is correct for P.

Details of Alternate Execution Semantics

An OOM identifies a universe of typed values as follows. Let String denote the set of all strings, which constitute the primitive values in the system. For a class C, let fields(C) denote the set of fields of class C (including its inherited fields). An object of type C is an ordered pair (C,m), where m is a map (function) from fields(C) to other objects of the appropriate type or strings (as per the type of the fields) or a special value null. Let O denote the set of all typed objects, including the special value null, and let U denote the set O ∪String. An object o∈O is said to be an instance of class B iff o=(C,m) where C is a derived class of B.

FIG. 3 defines various auxiliary functions used to define the alternate semantics based on a LOOM. The program state in the alternate semantics is represented by a single object $\sigma \in O$. An access path ap serves to identify a field of a subobject (of the program state object $\sigma$); the function $\text{lookup}_P(\sigma, ap)$ defined in FIG. 3 retrieves the value of this field. As observed earlier, an access path implicitly incorporates downcasts. Hence, the lookup may fail, and, in this case, the lookup function returns null. The function $\text{update}_P(\sigma, ap, v)$ updates the value of the field identified by ap with its new Value v. Note that this is a functional update and returns an object $\sigma'$ representing the updated state (object).

We now present the alternate semantics for MiniCobol statements. Consider a MOVE statement S of the form MOVE X TO Y. Let $X_S$ denote the occurrence of X in statement S. Executing statement S in a state $\sigma$ produces the state $\text{update}_P(\sigma, Y_S, \text{lookup}_P(\alpha, X_S))$. The execution of the program halts if any top-level call to lookup or update returns null. We now consider READ and WRITE statements. A READ statement reads a string from the input file, while a WRITE statement must write out a string to the output file, even in the alternate semantics. This motivates the following definition. Let $\text{String}_k$ denote the set of all strings of length k. For any data-source or data-sink x, let |x| denote the length of the data-source or data-sink. A serialization model $(\alpha,\gamma)$ consists of a pair of functions: a deserialization function $\alpha$ that associates every data-source x with a function $\alpha(x): \text{String}_{|x|} \to O$ and a serialization function $\gamma$ that maps every data-sink r with a function $\gamma(x): O \to \text{String}_{|r|}$.

Given a serialization model, in addition to the LOOM, it is straightforward to define the alternate semantics for READ and WRITE statements. The execution of a READ X statement S reads a string of the appropriate length from the input file, deserializes it into an object v, and then produces the state $\text{update}_P(\sigma, X_S, v)$. The execution of a WRITE X statement S first retrieves the value $\text{lookup}_P(\sigma, X_S)$, serializes it into a string, and writes it out.

Related Work

An important aspect of the preferred embodiment of the invention is that it is path sensitive. That is, the preferred embodiment of the instant invention distinguishes program states satisfying different predicates at the same program point, and uses this mechanism both for more accurate analysis (less pollution), and for inferring subtyping in a general manner. Furthermore, in its preferred embodiment, the invention infers the nesting structure of classes by analyzing the actual usage of variables in the code. Another contribution and important aspect of the preferred embodiment of the invention is that it is a semantic characterization of correct LOOMs, and an accompanying alternate execution semantics for LOOMs which can serve as the basis for porting a Cobol program to an object-oriented language.

The preferred embodiment of the invention makes a distinction based on value partitions (i.e., can infer multiple types at a single program point), and also introduces factoring in the model by bringing in the notion of equivalent fields (fields that are referred to by a common variable occurrence), and by unifying and pulling up such fields to common base classes. This approach enables the use of any value partition given as a parameter.

A path sensitive approach is described in the paper "Guarded Types for Program Understanding," In Proc. Int. Conf. on Tools and. Algorithms for the Construction and Analysis of Systems (TACAS), Pages 157-173 (2005) (Komondoor, et al.), the disclosure of which is herein incorporated by reference in its entirety.

For the following discussion, consider the example shown in FIG. 1 of Komondoor, et al., which is shown in FIG. 6 herein.

We will use the term "input-point" to denote a point in the program where the program receives some input data from an external source. For example, a statement through which the program reads data from a file, or a statement through which the program accepts input from a human user are both input-points. In the case of a program that is programmatically accessed (that is, is called by another program), then the program's entry statement (through which the program receives values for the program's parameter variables) constitutes an input-point.

We use the term "input-element" to denote a program variable (or memory locations) that receive the input data from the external source at an input-point.

Similarly, we use the term "output-element" to denote program variables or memory locations containing output data that are returned by the program or sent to an external consumer (e.g., via a WRITE statement that writes to a file).

In our example of FIG. 6, (TACAS paper FIG. 1), the statement numbered 1 is an input-point. Further, the variable PAY-REC in this statement constitutes an input-element. Statements numbered 7 and 9 constitute output-points with PAY and DATA[6:9] constituting output-elements.

We use the term predicate-class to denote a set of values described by a predicate (constraint). The following examples illustrate predicate-classes. Here, "values" are essentially byte-sequences or strings, which are suitable for describing data manipulated by programs in weakly-typed languages such as Cobol, but this can be generalized.

A simple example of a predicate class is the set of all strings of length 14. Let us call this predicate class the payment-info. This predicate class helps describe the input data received by the input-element PAY-REC in statement 1.

Another example is the set of all strings of length 14, where the first character is an 'E'. Let us call this class the employee-payment-info class. This predicate class can be used to describe a special set of values (or input data) received by the input-element PAY-REC in statement 1.

Another example is the set of all strings of length 14 where the first character is not 'E'. Let us call this class the visitor-payment-info class.

(1) Consider the data read in statement /1/. The paper shows how the algorithm described therein identifies two interesting classes of this input data: namely those that have an 'E' in the first-byte, and those that do not. These two classes form a predicate classification of this input data and claim E.1 is for a method for identifying such a predicate classification.

(2) The TACAS paper also shows how the algorithm described therein identifies that when the input data has an 'E' in the first byte (thus, when it falls into the first predicate class), bytes 8 through 11 of the read data may flow to the variable PAY in line /4/.

(3) The TACAS paper also shows that the algorithm described therein infers the following structure for the input data at statement /1/ corresponding to the first predicate class: a 1 byte datum (containing the value 'E'), followed by a 7 byte datum, followed by a 4 byte datum, followed by a 2 byte datum. This structure may be referred to as an element of the "model." The algorithm similarly infers a model element for data corresponding to the second predicate class (the two model elements corresponding to the two predicate classes are shown separated by "|" signs).

We could also compute, e.g., information such as: the last 2 byte datum referred in the previous paragraph is not used in the program.

We can also compute some more information. For example, assume that the statement /4/ contains some arithmetic, say addition, involving DATA[8:11]. Then, we can infer that this piece of datum (as mentioned two paragraphs ago) may be used as an operand to an addition operation.

(4) The right-hand-side of the example FIG. 6 illustrates how the algorithm described in the paper infers a set of structures (model elements) for each variable occurrence (the model elements are shown separated by "|" signs); the variable occurrence is "linked" to each of the model elements inferred for it.

(5) The model of data in a data store may be obtained by combining the models of the variables that are read from that data store or are written to that data store. Thus, the data store is linked to every model element that these variables are linked to.

(6) The first step in creating a relational database schema for data that exists in a data store is to obtain the model for the data in the datastore. For example, consider the example in the figure. The data store IN-F is linked to the same two model elements as the variable PAY-REC (because PAY-REC is the only variable that is read from or written to IN-F). These two model elements are: 'E':Emp×Eid×Salary×Unused, and !{'E'}:Vis×SSN5×SSn4×Stipend (see to the right of statement /1/). These two elements can be viewed, respectively, as (two distinct) entities in an entity-relationship model (with each entity containing four attributes). These two entities can be translated in to a relational database schema using known modeling techniques/tools (e.g., ERWin). In this example, these techniques are likely to produce two relational tables, corresponding to the two entities; in other words, the single datastore IN-F is translated in to two relational tables, one to store Employee records and the other to store Visitor records.

(7) Consider the problem of transforming an existing system into a service-oriented architecture. It is necessary in this context to identify the services one wishes to expose from the given system. The set of predicate classes we identify as above can help identify the kind of services one might wish to expose from the system. In particular, each model element linked to each input-element (or to a user-selected input-element) is a candidate service. For example, consider the discussion in (6) above. The two model elements linked to the input-element (PAY-REC) in statement /1/ indicate two candidate services—the employee service (corresponding to the first byte in PAY-REC being 'E'), and the visitor service (corresponding to the first byte in PAY-REC being not 'E').

Also, an implementation for a candidate service can be generated by static analysis. Specifically, we take the model element (of the input-element) that the service corresponds to, consider the predicate that characterizes this model element (in the example, the predicate that characterizes the first of the two model elements linked to the input-element PAY-REC at statement /1/ is "first byte in PAY-REC is 'E'"), and "partially evaluate" the program wrt this predicate. Partial evaluation is a well-known static analysis technique; it takes a program, an input-element to the program, and a predicate which characterizes this input-element, and produces a subset of the program that contains the statements that are reached during execution when the input to the program satisfies the predicate. In the example, partially evaluating the program wrt the first predicate (i.e., "the first byte in PAY-REC is 'E'") gives a subset program that contains only statements /1/, /2/, /3/, /4/, and /7/. This subset computes and writes out the salary of an employee, and hence implements the first service mentioned in the previous paragraph (the employee service). Similarly, an implementation for the second service can be obtained.

Once a service implementation has been obtained, the output-elements of this implementation (i.e., the output-elements considering this implementation as a stand-alone program) can be easily identified. For example, in the employee-service implementation mentioned above (statements /1/, /2/, /3/, /4/, and /7/ in the figure), the output-element is PAY. Moreover, when we restrict ourselves to this predicate class (i.e., the first byte in PAY-REC is 'E'), the model element linked to PAY-REC is 'E':Emp×Eid×Salary×Unused, while the model element linked to PAY is Salary. Therefore, the service interface corresponding to the employee service would have the model element linked to the input-element of this service (i.e. 'E':Emp×Eid×Salary×Unused) as its input type, and the type Salary as its output type.

As indicated hereinabove, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for inferring a classification of the input data to a program or the data stored in a set of memory locations at a certain program point, where each class of data is described by a predicate and is known as a predicate class, by analyzing how the program uses the said input data, said method further comprising a step which, given the said program, an input-point I or a set of memory locations M at a program-point J, and a predicate class C infers one or more dataflow facts that indicate that certain parts of the input data obtained at the said input point I, or the data stored in the said set of memory locations M at the said program point J, may flow to certain other parts of the program when the said data belongs to the said predicate class C and said method further comprising a step which, given the said program, infers a logical model comprised of one or more logical model elements, where each logical model element describes one or more features of either certain parts of the said input data obtained from said input point I in the program and belonging to a certain predicate class C, or certain parts of data stored in said set of memory locations M at said program point J in the program and belonging to a certain predicate class C, with the said features being inferred by an analysis of how the said parts of input data are actually used at the various program contexts that they flow to, providing a physical data model of the legacy application, said physical data model having a plurality of physical elements, wherein the physical data model is a physical realization;

establishing a logical data model for the legacy application, said logical data model having the logical model elements;

establishing a plurality of links between said logical model elements and said physical elements, wherein the plurality of links are realized in a physical data model, which is a physical realization; and selecting one of said physical or logical elements, and using said links to identify all of the physical or logical elements that are linked to said selected one of said elements;

wherein said features described by the logical model elements include a description of the structure of the said data that reveals what parts of the said data is handled as an indivisible unit of datum by the program, and wherein said features in the logical model element include a set of primitive operations that may be applied to the said data and wherein auxiliary functions are used to define alternate semantics.

* * * * *